United States Patent
Albrecht et al.

(10) Patent No.: US 7,314,210 B2
(45) Date of Patent: Jan. 1, 2008

(54) GAS-SOCKET OUTLET

(75) Inventors: Günter Albrecht, Weddersleben (DE); Thomas Vogt, Bad Suderode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 75 days.

(21) Appl. No.: 10/550,243

(22) PCT Filed: Mar. 19, 2004

(86) PCT No.: PCT/EP2004/002886

§ 371 (c)(1), (2), (4) Date: Sep. 23, 2005

(87) PCT Pub. No.: WO2004/085916

PCT Pub. Date: Oct. 7, 2004

(65) Prior Publication Data

US 2006/0201079 A1    Sep. 14, 2006

(30) Foreign Application Priority Data

Mar. 24, 2003 (DE) ............... 103 12 997

(51) Int. Cl.
- F16K 51/00 (2006.01)
- F16L 29/00 (2006.01)
- F16L 37/28 (2006.01)

(52) U.S. Cl. .............. 251/149.8; 251/149.9; 137/360

(58) Field of Classification Search ............. 251/149.1, 251/149.3, 149.6, 149.8, 149.9; 137/360
See application file for complete search history.

(56) References Cited

U.S. PATENT DOCUMENTS

| | | | | |
|---|---|---|---|---|
| 3,532,101 A | * | 10/1970 | Snyder, Jr. | 137/75 |
| 4,344,455 A | * | 8/1982 | Norton et al. | 137/329.4 |
| 5,020,563 A | * | 6/1991 | Hoffman et al. | 137/75 |
| 6,185,876 B1 | | 2/2001 | Kummerfeld et al. | |
| 6,945,511 B2 | * | 9/2005 | Schulze | 251/149.8 |
| 2004/0065859 A1 | | 4/2004 | Schulze | |
| 2005/0016590 A1 | | 1/2005 | Albrecht et al. | |

FOREIGN PATENT DOCUMENTS

| | | |
|---|---|---|
| DE | 81 36 272.2 | 6/1982 |
| DE | 3519933 | 12/1986 |
| DE | 91 12 208.2 | 1/1992 |
| FR | 2 642 139 | 7/1990 |

* cited by examiner

*Primary Examiner*—Gregory Huson
*Assistant Examiner*—John K. Fristoe, Jr.
(74) *Attorney, Agent, or Firm*—Howard & Howard Attorneys, P.C.

(57) ABSTRACT

A gas socket is to be provided which can be used for surface installation. The final installation of the gas socket must still be possible after the construction of the installation site has been fully completed. Replacement of the externally visible area of the gas socket shall also be possible. For this purpose, the gas socket comprises a housing (1), a shutoff device (10), a retaining element (29) and a cover (35) open on its face-side. The housing (1) is mounted in a torsion-proof way in the retaining element (29) which is connected with the wall (28) in a stationary way. The shutoff device (10) can be mounted on the retaining element (29). The cover (35) has an opening (36) in one of its side walls for an inlet port (2) and otherwise surrounds the housing (1) in a freely movable way, while it is supported on the wall (28) on the one hand and on the shutoff device (10) on the other when the shutoff device (10) is fastened.

5 Claims, 1 Drawing Sheet

GAS-SOCKET OUTLET

FIELD OF INVENTION

Figure 1:
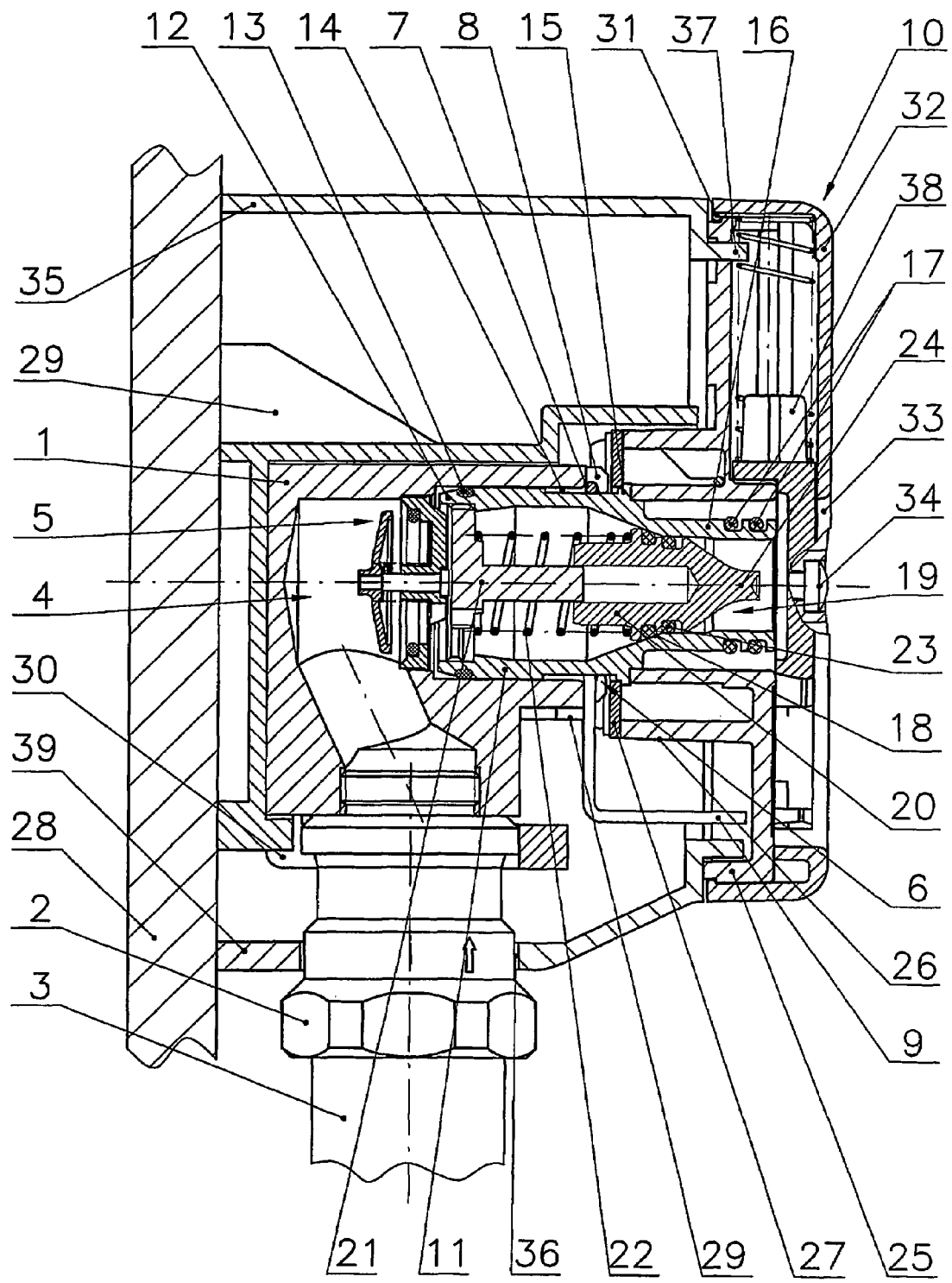

The invention is related to a gas socket with a housing comprising an inlet port for creating a fixed connection between the gas socket and a gas piping installed in a stationary way on a wall, as well as a shutoff device for the connection of a gas connecting plug. When the gas connecting plug is connected, the shutoff device releases the internal gas path only after external tightness has been established.

BACKGROUND OF THE INVENTION

Gas sockets are used to provide a connection between a gas piping installed in a stationary way in buildings and a gas-operated appliance such as a gas cooker or tumble drier. The gas socket ensures easy connection between gas consumers and the gas piping.

Such a gas socket is described in DE 100 61 653 C1. This gas socket consists of a base body with integrated inlet port to establish a fixed connection with the stationary gas piping, an outlet port screwed into the base body and a base plate surrounding the external shell of the outlet port at a defined distance for the reception of the gas connecting plug and otherwise bolted with the base body. Furthermore the base plate serves as a stop on a wall to which it is also fastened. A hood is fastened to the base plate which, when the gas connecting plug is not plugged in, closes the connecting opening of the outlet socket with a cover, and the cover is provided with a locking device. This locking device is unlocked by the first insertion movement of the gas connecting plug to which the locking of the cover has been adapted. With the help of at least one further movement of the gas connecting plug the cover releases the connecting opening of the outlet port for the connection of the gas connecting plug.

Another solution described in DE 101 51 995 C1 consists of a gas socket provided with location adjustment of the gas socket related to the external surface of the wall thus providing a balancing of location deviations in relation to the stationary gas piping. For this purpose, the gas socket is equipped with a housing, a shutoff device and a fastening element. The housing is provided with an inlet socket for establishing a fixed connection of the gas socket with a stationary gas piping. The shutoff device is used to connect a gas connecting plug, and the internal gas path is not released until external tightness has been established. The shutoff device protrudes into the housing in a gas-tight way with a tube-shaped nozzle provided with a collar on the side facing the housing, which is limited by a stop groove. A spring-loaded retaining ring ensures the sliding of the nozzle into the housing, while sliding out of the nozzle from the housing is not possible. The fastening element is connected with the wall on the one hand and with the shutoff device on the other, while the shutoff device is slewable towards the housing along the longitudinal axis of the nozzle after the fastening element has been detached on one side.

The disadvantage of these two solutions is that they can only be used as in-wall or flush-mounted installations. If however, the decision in favour of a gas appliance is made after completion of the building, the laying of the gas pipeline within the wall, if possible at all, is only possible with high effort and cost. In such cases the gas piping is normally installed on the wall and requires a surface-mounted gas socket.

A further embodiment of a gas socket is described in DE 35 19 933 A1. Here the gas socket is equipped with a tube-shaped gas passage body rotatable in the housing, for the reception of a gas connecting plug, and an inlet duct installed at a right angle to the gas passage body. The shutoff device consists of a ball rotatable around the longitudinal axis of the gas passage body, with a right-angle ball duct. The inlet end of the gas passage body protrudes into the outlet end of the ball duct and is coupled with the ball in a torque-proof way. With its diametrically opposed sides in the longitudinal direction of the inlet duct the ball adheres to two elastic O-rings of the housing, where one of the O-rings is arranged at a pipe joint installed in the inlet duct with which the O-ring can be pressed against the ball.

This solution can be used for surface-mounted installations. The disadvantage, however, is that installation also includes the visible area of the gas socket. This involves the danger that up to the final completion of a room, damage such as scratches may occur which has a negative impact on the outer appearance of the gas socket. A further disadvantage is that it is not possible to adapt or replace the visible part of the gas socket during subsequent renovation and repair work.

BREIF DESCRIPTION OF DRAWINGS

FIGURE is a cross-sectional view of the gas socket.

DETAILED DESCRIPTION OF THE INVENTION

The invention is based on the underlying task of developing a gas socket of the above-described type which can be used for surface-mounted installations. The aim is to ensure that the final installation of the externally visible part of the gas socket is possible after the installation site, e.g. a room, has been fully completed from the constructional point of view. Furthermore, replacement of the externally visible part of the socket must be possible without much extra effort.

In accordance with the invention, the problem is solved by providing the gas socket with a housing, a shutoff device, a retaining element and a cover open on the face side. The housing is provided with an inlet port for establishing a fixed connection of the gas socket with a stationary wall-mounted gas piping. The shutoff device is used to connect a gas connecting plug, and the internal gas path is not released until external tightness has been established. The shutoff device protrudes into the housing in a gas-tight way with a tube-shaped nozzle that can be shifted in longitudinal direction. The housing is fastened in the retaining element in a torsion-proof way, and the retaining element is connected with the wall in a stationary way. Furthermore, the shutoff device can be fastened to the retaining element. The cover open on its face side has an opening for the inlet port in a side wall and otherwise surrounds the retaining element and the housing in a freely movable way, while, when the shutoff device is fastened, it is supported on the wall on the one hand and the shutoff device on the other.

Thus a solution has been found which removes the disadvantages of the state-of-the-art solutions. The gas socket can subsequently be connected to a gas piping installed on the wall, and the externally visible part of the socket can be installed after the installation site has been fully completed. Thus the piping can be installed in the generally accepted way without any additional effort. Replacement of the visible part of the gas socket is thus also possible.

In order to facilitate position adjustment between the shutoff device and the shell, it is advantageous if the face of the cover pointing towards the shutoff device has an at least partially circumferential web protruding into the shutoff device when the latter is fastened.

EXAMPLE

The gas socket of the invention is described below using an embodiment as an example. The only FIGURE shows a wall-mounted gas socket in sectional view in its closed position.

The gas socket of the invention comprises a housing 1 which has an integrated inlet port 2 that is arranged at a right angle to the longitudinal axis of the housing 1 in this embodiment, where the inlet port 2 is provided with a female thread to establish a firm connection of the gas socket with a stationary gas pipeline 3. It is understood that the connection can also be established as a press-fit or in a similar way. The gas inlet formed by inlet port 2 leads into a space 4 where a gas flow monitoring device is pressed in after the gas inlet.

In the immediate vicinity of a face-side opening 6 of housing 1, the space 4 is provided with a groove 7 that is interrupted in the area of a recess 8. A spring-loaded circular retaining ring 9 is installed in the groove 7.

A nozzle 11 belonging to the shutoff device 10 protrudes into space 4 of housing 1, where the nozzle 11 has a collar 12 with a circumferential groove on its end located in housing 1, with an O-ring 13 installed in the groove and ensuring the required external gas tightness. On its housing-facing side the collar 12 is limited by a stop groove 14 that is separated by a collar 15 serving as a stop from an adjacent outlet port 16 comprising the gas outlet, which is formed to receive a gas connecting plug. Two O-rings 17 located on the external circumference of the outlet port 16 are used to ensure external gas tightness.

With its internal contour, the nozzle 11 forms a valve seat 18 for a shutoff valve 19 whose closing mechanism 20 is mounted on a guide element 21 in such a way that in can move in longitudinal direction to the axis of the nozzle 11 and thus also valve seat 18. The closing element 20 is spring-loaded through the force of a closing spring 22 one end of which is supported on the guide element 21, while the other end is supported on the closing element 20. To ensure gas tightness, O-rings 23 are installed on the closing element, adhering to the valve seat 18 in their closed position. The closing element 20 protrudes into the outlet port 16 with its axial extension 24.

A base-plate 25 forming part of the shutoff device 10 is provided with a tube-shaped dome 26 which surrounds the external shell of the outlet port 16 at a distance required by the gas connecting plug. On the face-side of the dome 26, the stop 15 of nozzle 11, shaped as a collar, is supported and pressed against the dome by a retaining plate 27 bolted to dome 26.

A pot-shaped retaining element 29 is fastened with its rear side in a generally well-known way, e.g. by bolts and dowels (not shown), to a wall 28. The internal space of the retaining element 29 is shaped in such a way that it can receive the housing 1 and, in this embodiment, also, in a torsion-proof way, the dome 26 to enhance stiffness. In particular from the point of view of manufacturing, a rectangular cross-section is recommended for the housing 1 and for the dome 26 and thus also for the internal space contour of the retaining element 29. Furthermore, the retaining element 29 is opened on one side in order to enable the insertion of inlet port 2.

In order to fasten the housing 1 in this torsion-proof position in retaining element 29, a bracket 30 reaching beyond the inlet port 2 is fastened on the part of the retaining element 2 adhering to wall 28.

The base plate 25 is connected via stop elements 31 with a hood 32 covering it. On its front side, the hood 32 has two bores to receive the fastening bolts 34 which are bolted with the retaining element 29 through the threaded holes therein. In addition, an elongated hole 33 is provided, with the gas outlet of the outlet port 16 being located behind one part of the elongated hole 33. The elongated hole 33 is closed by a slide 38 in its closed position shown on the FIGURE.

Two further functional elements are located between the hood 32 and the base plate 25. This function is known to experts and not essential for the invention. Therefore this function is not further explained here.

Between the wall 28 and the shutoff device 10, a cover 35 open on both faces is arranged which, in the area of inlet port 2, is provided with an additional lateral opening 36 for the passage of the port. While the cover 35 can be freely moved and removed when the shutoff device 10 is not installed, as is the case after completed installation of the gas piping 3 with housing 1 and the attached retaining element 29, it will be fully tightened between the wall 28 and the shutoff device 10 when the shutoff device 10 is fastened on the retaining element 29, i.e. when the gas socket is completed. In order to find the correct position alignment between the cover 35 and the hood 32 without much effort, in particular when a rectangular shape is used, the cover 35 is provided with a partially circumferential web 37 on its side facing the shutoff device. This web performs a guide function during the fastening process and protrudes into the shutoff device 10 when the latter is fastened.

In particular for optical reasons, the remaining gap in cover 35 formed when the gas socket is completed, can be closed by an additional slide-in closure 39.

| List of reference numbers | |
|---|---|
| 1 | Housing |
| 2 | Inlet port |
| 3 | Gas piping |
| 4 | Space |
| 5 | Gas flow monitoring device |
| 6 | Opening |
| 7 | Groove |
| 8 | Recess |
| 9 | Retaining ring |
| 10 | Shutoff device |
| 11 | Nozzle |
| 12 | Collar |
| 13 | O-ring |
| 14 | Stop groove |
| 15 | Stop |
| 16 | Outlet port |
| 17 | O-ring |
| 18 | Valve seat |
| 19 | Shutoff valve |
| 20 | Closing element |
| 21 | Guide element |
| 22 | Closing spring |
| 23 | O-ring |
| 24 | Extension |
| 25 | Base plate |
| 26 | Dome |
| 27 | Retaining plate |
| 28 | Wall |
| 29 | Retaining element |
| 30 | Bracket |
| 31 | Stop element |
| 32 | Hood |

-continued

| List of reference numbers | |
|---|---|
| 33 | Elongated hole |
| 34 | Fastening bolt |
| 35 | Cover |
| 36 | Opening |
| 37 | Web |
| 38 | Slide |
| 39 | Closure |

The invention claimed is:

1. A gas socket assembly, comprising:
a housing (1) including an inlet port (2) for providing a fixed connection of the gas socket with a gas pipe installed on a wall (28);
a shutoff device (10) for the connection of a gas connection plug which, when the gas connecting plug is connected, does not release an internal gas path until external tightness is established;
wherein the shutoff device (10) protrudes in a gas-tight way into the housing (1) with a substantially tube-shaped nozzle (11) that can be shifted in a longitudinal way;
a retaining element (29) connected with the wall (28), where the housing (1) is slidably received in the retaining element (29) in a torsion-proof way; and
a cover (35) open on its face-side which, in one of its side walls, has an opening (36) for the inlet port (2), wherein the cover (35) surrounds the retaining element (29) and the housing (1) and is freely removable therefrom when the shutoff device (10) is not fastened to the housing (1);
wherein the cover (35) is fixedly secured to and supported on at least a portion of the wall (28) and at least a portion of the shutoff device (10) when the shutoff device (10) is fastened to the housing (1).

2. The gas socket assembly in accordance with claim 1, where a face portion of the cover (35) pointing in the direction of the shutoff device (10) is provided with an at least partially circumferential web (37) which, when the shutoff device (10) is removably fastened to the cover 35, engages a surface of the shutoff device (10).

3. The gas socket assembly in accordance with claim 1, wherein the retaining element (29) includes a substantially rectangular recess formed therein.

4. The gas socket assembly in accordance with claim 3, wherein the housing (1) includes a substantially rectangular configuration.

5. The gas socket assembly in accordance with claim 4, wherein the substantially rectangular configuration of the housing (1) substantially coffesponds to the dimensions of the substantially rectangular recess of the retaining element (29).

* * * * *